United States Patent [19]

Matter et al.

[11] Patent Number: 4,813,718

[45] Date of Patent: Mar. 21, 1989

[54] CLAMPING COLLAR

[75] Inventors: Claude Matter, Magnaville; Philippe Paquit, Chevremont; Pierre Jeanguenin, Montbelliard, all of France; Jean-Pierre Liebert, Dottignies; Fredy Vanmeenen, Mouscron, both of Belgium

[73] Assignee: AWAB, S.A., Tourcoign (Nord), France

[21] Appl. No.: 99,549

[22] Filed: Sep. 22, 1987

[51] Int. Cl.⁴ ............................................... F16L 21/06
[52] U.S. Cl. ...................................... 285/373; 285/419
[58] Field of Search ................................. 285/373, 419

[56] References Cited

U.S. PATENT DOCUMENTS

| | | | |
|---|---|---|---|
| 813,674 | 2/1906 | Skirrow | 285/419 X |
| 2,227,551 | 1/1941 | Morris | 285/373 |
| 3,700,008 | 10/1972 | Hackman | 285/373 X |
| 3,801,141 | 4/1974 | Hollingsworth | 285/373 X |
| 3,944,265 | 3/1976 | Hiemstra et al. | 285/373 X |
| 4,049,298 | 9/1977 | Foti | 285/373 X |
| 4,312,526 | 1/1982 | Cassel | 285/419 |
| 4,463,975 | 8/1984 | McCord | 285/419 |
| 4,466,642 | 8/1984 | Tonchen | 285/419 |

FOREIGN PATENT DOCUMENTS 1282373 11/1968 Fed. Rep. of Germany ...... 285/373
134426 11/1919 United Kingdom ................ 285/373

Primary Examiner—Thomas F. Callaghan
Attorney, Agent, or Firm—Emmanuel J. Lobato; Robert E. Burns

[57] ABSTRACT

This clamping collar, notably for the automotive industry and more particularly for coupling and sealing the joints between the component elements of an exhaust and muffler system, permits the end to end coupling of these elements. The collar consists of a flexible strap bent to an open-loop configuration and adapted to encircle the pipe end, the ends of the collar being interconnected by tightening means such as bolts. The collar ends are stiffened in the longitudinal direction by using longitudinal plates disposed inside the bent ends of the collar; the tightening means extend through holes formed in the collar ends and in plates. The plates provide a better distribution of the tightening stress. The collar is also provided with leakage-preventing means in the form of flexible tongues possibly lined with thin metal blades which become operative when tightening the collar in position.

9 Claims, 3 Drawing Sheets

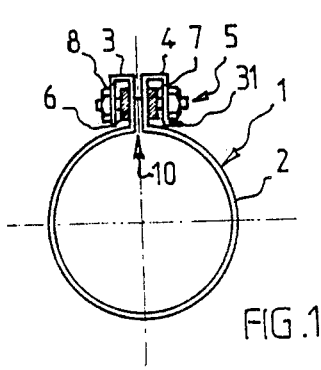
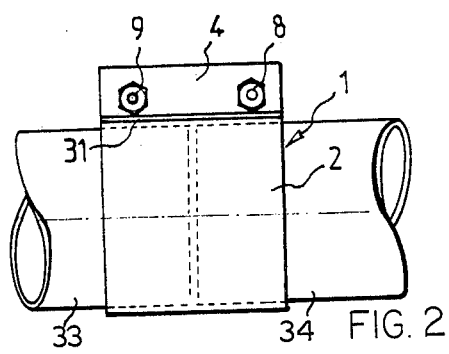
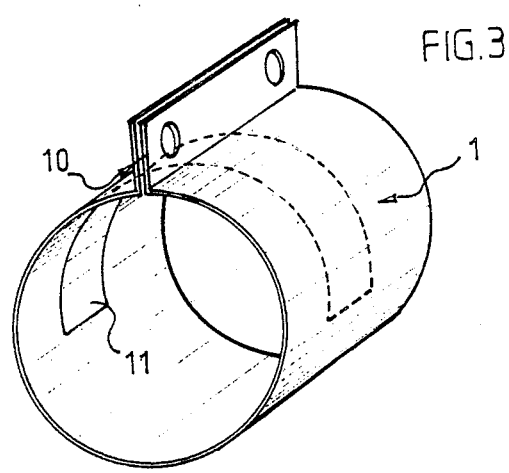
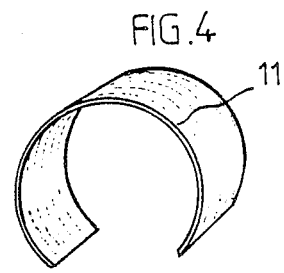
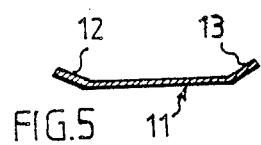
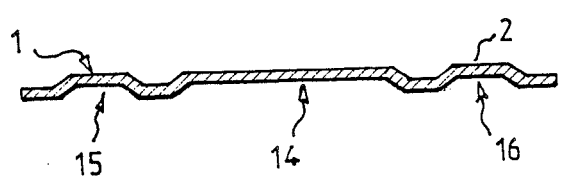

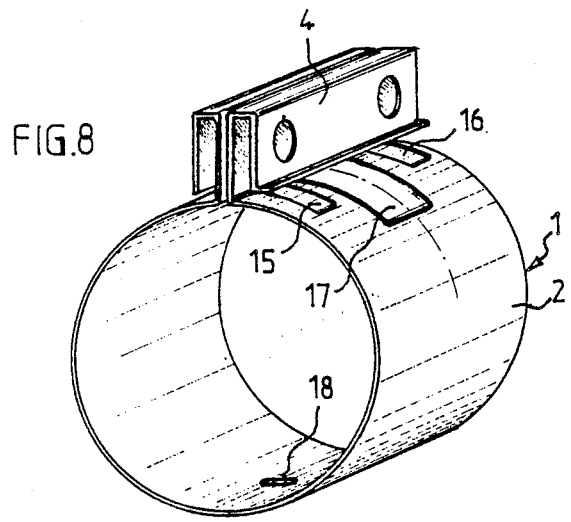
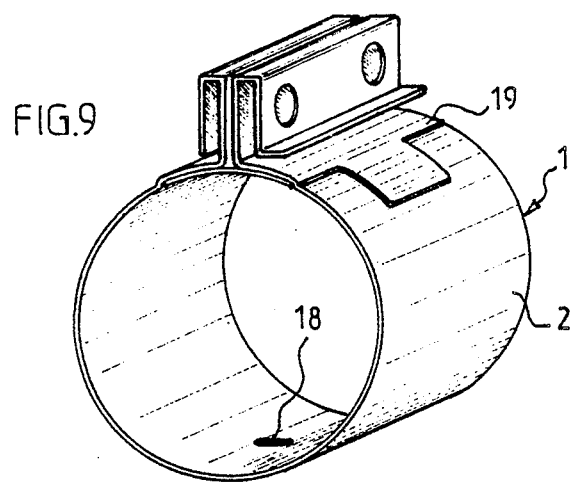
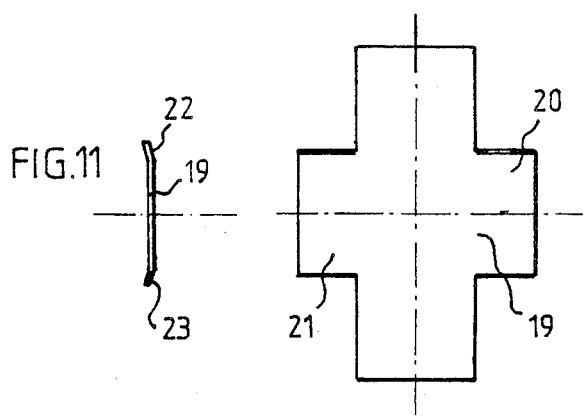

CLAMPING COLLAR

BACKGROUND OF THE INVENTION

1. Field of the Invention

The present invention relates to clamping collars and is applicable notably to the field of the automotive industry, for example for coupling and clamping the various component elements of an exhaust pipe and muffler system.

The usual function of a clamping collar is to exert a tangential stress on the member about which it is disposed in order to cause a shrinkage of its diametral dimensions and consequently a clamping action.

2. The Prior Art

Various clamping collar types have already been proposed, their design and mode of operation being consistent with the specific use for which they are intended. More particularly, if in addition to their clamping function they must provide a reliable fluid-tightness, they must also have certain well-defined properties.

Regarding the specific domain of clamping collars intended for attaching and coupling the various component elements of the exhaust system of motor cars, nowadays these devices consist mainly of a split ring having its ends assembled by a clamping bolt. The split ring is cut and pressed from a metal sheet blank so that it can withstand the relatively high temperatures developed in actual service.

An exhaust pipe system comprises a plurality of interfitting pipe sections providing an adequate fluid-tightness at the joints. The first pipe section at the engine end of the system is split so that its diameter can undergo a certain degree of distortion when the collar disposed around the outer periphery of the coupling is tightened.

This arrangement was acknowledged as satisfactory at the first onset, though the resultant fluid-tightness is far from perfect; moreover, the clamping collar may be of very simple design.

However, exhaust system component elements are exposed to oxidizing factors reducing their useful life at a rate increasing with the temperature developed by the engine. Moreover, these exhaust components are usually disposed under the vehicle floor and therefore exposed to all kind of splashes so that after a relatively short time it is impossible to disassembled the pipe sections from one another. This seizing of the exhaust system elements constitutes a serious trouble since in many cases only one part of the system must be replaced and this impossibility of disassembling the parts is such that the complete exhaust system must be replaced unnecessarily. Obviously, the final cost of this operation is high and the car owner is not pleased.

In an attempt to solve this problem, some manufacturers have used and still use the so-called biconical fitting method. In this case, one end of the pipe to be connected is outflared and the adjacent end of the other pipe to be connected has an externally bevelled contact surace engageable by the outflared edge of the first pipe. The joint is consolidated by means of a collar having an internal V-sectioned groove encircling the two pipe ends.

However, this collar must necessarily be split into two halves so that the assembling thereof is more difficult than with conventional collars. Moreover, the manufacture of collars of this type is more complicated and consequently more expensive.

Though satisfactory from the technical point of view, this arrangement is awkward to use, and furthermore it is expensive and therefore not likely to be widely accepted in the automotive field.

The use of plain tubular pipes assembled in end to end relationship is more satisfactory since in this case the pipe manufacture is simplified and therefore more economical. On the other hand, the clamping collar must be such that it will not only provide the necessary mechanical coupling of the two pipe ends but also the fluid-tightness of the coupling joint.

SUMMARY OF THE INVENTION

It is the primary object of the present invention to provide a clamping collar intended more particularly for the automotive industry for interconnecting and mutually sealing the various component elements of an exhaust system while permitting the end to end relative arrangement of these pipe elements.

It is another object of the present invention to provide a clamping collar which is economical to manufacture and therefore adequate for a wirespread commercial use.

Furthermore, with the clamping collar of the present invention the assembly and disassembly times are extremely short and consistent with modern manufacturing methods and also with after-sale maintenance or replacement operations.

Other objects and features of the present invention will appear as the following description proceeds with reference to various forms of embodiment thereof shown in the appended drawings and given by way of example, not of limitation.

According to the present invention, the clamping collar applicable more particularly in the automotive industry for interconnecting and tightly coupling the various component elements of an exhaust system comprising several pipe sections disposed in end to end relationship, said collar consisting essentially of a flexible strap bent to an open loop configuration, adapted to encircle a pipe, the strap ends being coupled to clamping or tightening means, is characterized in that the ends of said strap are stiffened in the longitudinal direction to improve the distribution of the tightening effort, and that it comprise sealing means becoming operative during the tightening of the collar.

A clearer understanding of the present invention will be had from the following description of preferred forms of embodiment shown in the attached drawings.

THE DRAWINGS

FIG. 1 is an end view of the clamping collar according to a first form of embodiment thereof;

FIG. 2 is a side elevational view of the collar of FIG. 1;

FIG. 3 is a diagrammatic perspective view of the collar of Figures 1 and 2, showing the positioning of a sealing strip in the clamping collar of the instant invention;

FIG. 4 is a perspective view of the sealing strip of FIG. 3;

FIG. 5 is a cross-sectional view of the sealing strip;

FIG. 6 is a fragmentary longitudinal section showing the positioning of the sealing strip in a groove formed in the clamping collar;

FIG. 7 illustrates in fragmentary longitudinal section the positions of end stops formed on the clamping collar for improving the stress distribution;

FIG. 8 is a perspective view of the clamping collar with a sealing strip secured thereto;

FIG. 9 is a perspective view of the clamping collar provided with a cross-shaped strip according to a preferred form of embodiment of the invention;

FIG. 10 is a plan view of the cross-shaped strip of FIG. 9;

FIG. 11 is a cross-sectional view of the cross-shaped strip;

DESCRIPTION OF THE PREFERRED EMBODIMENTS

Figure 12:
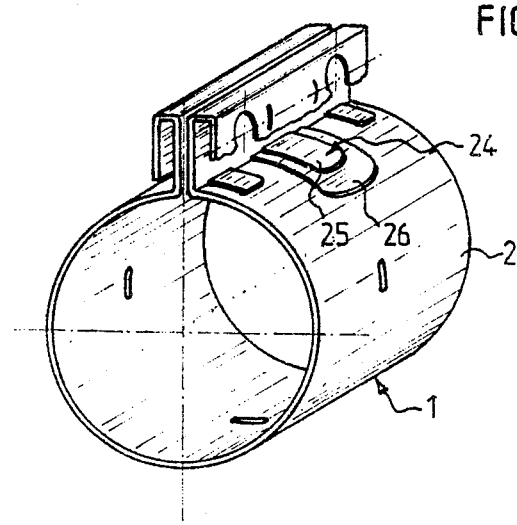
FIG. 12 illustrates in perspective the structure of the clamping collar, wherein the sealing member is a metal blade.

The clamping collar constituting the subject-matter of the present invention is intended more particularly for the automotive industry and concerned essentially with the coupling and tightening of the various component elements or sections of an exhaust system.

Nowadays, the various pipe sections constituting, with the muffler or mufflers, the exhaust system of an automobile vehicle are interconnected by interfitting the adjacent pipe ends and clamping circumferentially the tail end of the leading pipe in which a slit is formed to permit its contraction and improve the coupling rigidity.

This conventional procedure would be entirely satisfactory were it not for the fact that after a relatively short time it becomes impossible to disassemble the pipe sections due to the seizing thereof of oxidation.

A solution to this problem may consist for example in using tapered interfitting parts, but in this case the clamping collar must necessarily consist of two half-collars and consequently assembly difficulties and a higher cost of the parts may be expected.

The present invention relates more particularly to a clamping collar adapted to assemble and seal the coupling of two pipe sections disposed in end-to-end or abutting relationship.

This arrangement is advantageous for on the one hand the manufacture of the exhaust pipes does not involve any particular machining of their end portions and on the other hand, due to the absence of any interfitting parts, the pipe sections can easily be disassembled even if they display signs of incipient oxidation.

One specific feature characterising the clamping collar intended for coupling two pipe sections disposed end to end is that this collar is relatively long so that it will be secured to both parts. Therefore, specific tightening means must be used for this purpose.

FIGS. 1 and 2 of the drawings illustrate the clamping collar 1 of the present invention shown in axial end view and side elevational view, respectively.

This collar 1 consists essentially of a flexible strap 2 bent to an open loop configuration adapted to encircle the pipe ends to be coupled.

The ends 3 and 4 of the flexible strap 2 are coupled to tightening means 5 adapted to exert circumferential clamping stress on the collar and pipe ends.

According to the essential feature characterising the present invention, the strap ends 3 and 4 are stiffened in the longitudinal direction in order to improve the tightening stress distribution.

This tightening stress distribution is an important factor for two reasons. On the one hand, from the mechanical point of view it is desirable and necessary to obtain a reliable, firm coupling between the collar and the pipe ends so that in actual service vibration will not loosen the various component elements of the exhaust system. On the other hand, the stress distribution constitutes a factor most likely to promote a reliable fluid-tightness of the coupling joint.

On the other hand, it may be pointed out that in the matter of automobile construction the materials implemented in the manufacture of exhaust systems are relatively thin and consequently any excessive local stress would be attended by a deformation of the pipe without inasmuch providing a rigid assembly.

The stiffening of the end portions 3 and 4 of strap 2 of collar 1 may be obtained for example by increasing the strap thickness along the coupling area. However, according to the present invention, the preferred solution consists in using plates 6 and 7 about which the ends 3 and 4 of strap 2 are bent in the manner shown in FIG. 1.

Preferably, these plates 6 and 7 are cut from relatively thick metal stock, thus improving the stress distribution along the collar 1. This stress is exerted by means 5 consisting for example of a pair of bolts 8 and 9 which, notwithstanding their local tractive effort, generate a nearly uniform tangential stress along the collar 1 due to the presence of stiffening elements 6 and 7 through which said bolts 8, 9 are passed.

The use of two clamping means such as bolts 8 and 9 is advantageous in that it permits of compensating minor variations in the dimensions of the pipe sections to be coupled.

The second function devolved to the clamping collar 1 of the present invention is to seal the joint formed between the two adjacent pipe ends. Due to the presence of the slit 10 between the ends 3 and 4 of strap 2, exhaust gas leakages are most likely to occur therethrough. Therefore, according to the essential feature of the present invention, the clamping collar 1 comprises sealing means becoming operative during the tightening thereof. These means are such as to ensure an unbroken junction of the exhaust pipe sections and avoid any noise pollution in this area.

FIGS. 3 and 4 illustrate the positioning of these sealing means in the clamping collar and the structure of these sealing means, respectively.

The sealing means consist simply of a flexible strip 11 disposed inside the collar 1 and adapted to cover the contact joint of the pipe sections to be assembled. More particularly, this strip 11 covers the slit 10 of clamping collar 1. Thus, this strip 11 is interposed between the surrounding atmosphere and the joint formed between the two pipe sections across the joint formed between the two end portions 3 and 4 of the clamping collar. This strip 11 takes advantage of the circumferential tightening force exerted by the collar 1 and therefore undergoes a deformation causing this strip to conform to the pipe shape.

To avoid any exhaust gas leaks between the clamping collar 1 and the upper portion of strip 11, this strip has preferably the cross-sectional profile shown in FIG. 5.

The lateral edges 12 and 13 of strip 11 are bent and deformable in order to provide a tight contact between the clamping collar 1 and strip 11.

To keep the strip 11 from shifting undesiredly in the clamping collar 1 the length of this strip 11 will be preferably greater than the internal half-circumference of collar 1.

FIG. 6 illustrates in cross-sectional view the strap 2 of clamping collar 1 with the positioning of a sealing strip 11 having up-turned side edges 12 and 13.

Owing to the extra thickness resulting from the presence of strip 11 and to improve the distribution of the tightening stress, the clamping collar 1 is provided preferably with an internal groove 14 engageable by the strip 11.

A more uniform stress distribution may be obtained by providing lateral stop means 15 and 16 on either side of the groove 14 of the collar forming strap 2, as illustrated in FIG. 7.

The only inconvenience resulting from the use of the above-described sealing strip 11 is that it is an independent element most likely to be lost or to assume a wrong position; therefore, the use of a shorter strip 17 as illustrated in FIG. 8 and having one end secured to the co collar strap 2 is preferable.

It may also be emphasized that one may discerningly dispose in the inner central portion of collar 1 one or more axial stop means 18 for assisting in properly positioning the pipe sections to be coupled or assembled.

FIG. 9 illustrates another preferred form of embodiment of the invention which consists of a clamping collar in which the sealing means consists of a cross-shaped tongue 19.

The width of this tongue 19 corresponds to that of the collar, and this arrangement is advantageous because a uniform distribution of the clamping stress is thus warranted. In fact, in the clamping area the collar is only lined completely by the tongue 19 in this area.

In this specific form of embodiment the strap 2 constituting the collar 1 comprises on its inner surface a shallow, cross-shaped depression corresponding to the contour of said tongue 19 so that the latter will fit automatically in position therein without causing any deformation of the strap 2.

FIG. 10 illustrates the tongue 19 in its open-out condition, showing the lateral extensions 20, 21 adapted to cover and seal the coupling joint of the pipe sections, and thus conceal the clamping collar slit.

FIG. 11 is a section taken across one of the extensions 20, 21 of cross shaped tongue 19 and showing the bent side edges 22, 23 for improving the fluid-tightness of the assembly.

When the clamping collar is tightened by screwing the bolts 8, 9 the tongue 19 is pressed against the outer surface of the pipe sections, and when these bolts are firmly tightened a reliable fluid-tight seal is obtained.

Practical tests proved that it was rather difficult to fit the tongue 19 tightly in the coupling area of a pair of adjacent pipe sections. In fact, a compromise must be found between the tongue flexibility permitting the exertion of the resilient stress necessary for avoiding leakages and a flexible deformability of the tongue which enables it to conform to the surfaces concerned which in many cases are likely to display irregularities or defects.

Figure 13:
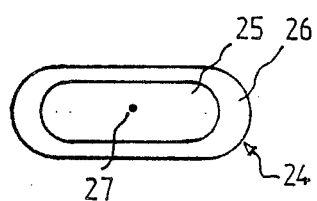
FIG. 13 is a plane view from above of the metal blade of Figure 12.

This problem is solved as illustrated in FIG. 12 wherein the sealing means 24 consists of a flexible tongue 25 lined with a thin metal blade 26, as shown in plane view from above in FIG. 13.

This thin metal blade 26 projects from the perimetral edges of the flexible tongue 25 and can thus cover completely the joint of the exhaust pipe sections.

The physical properties of the flexible tongue 25 and thin metal blade 26 respectively are such that a considerably improved fluid-tightness is obtained.

The flexible tongue 25 and thin metal blade 26 may be bonded together for example by means of a simple central weld spot 27.

When using this sealing device 24, a shallow groove corresponding to the cross sectional configuration of tongue 25 and blade 26 is formed in the inner surface of the collar forming strap 2.

The use of a sealing strip 11 as described hereinabove is objectionable in that exhaust gas leakages are likely to occur between the side edges of strip 11 and the side edges of groove 14. Though rather moderate, these leaks are nevertheless detrimental.

Therefore, according to a more elaborate form of embodiment of the present invention, means are provided for adjusting the axial position of the sealing means, notably the strip 11. These axial positioning means provide stop points positively preventing exhaust gas leakages, so that the fluid-tightness of the clamping collar is improved considerably.

Figure 14:
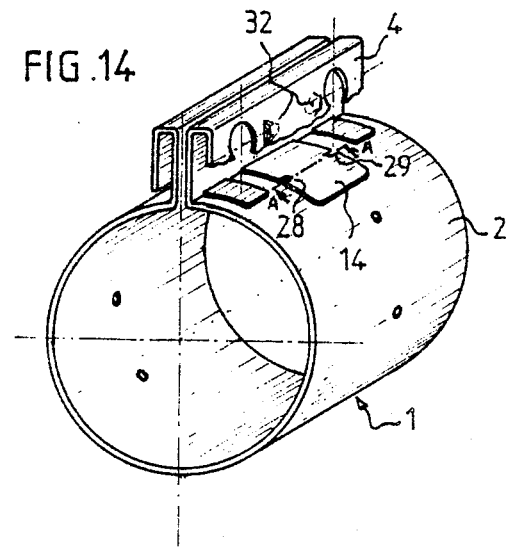
FIG. 14 is a perspective view showing a clamping collar with adjustable sealing means.

These stop points 28 and 29, as illustrated in FIG. 14, are disposed along the lateral edges of the groove 14 receiving the sealing strip 11.

Figure 15:
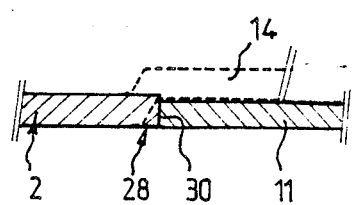
FIG. 15 is a section taken along the line AA of FIG. 14 in the adjustment area of the collar groove.

Constructionally, the stop point illustrated in cross sectional view in FIG. 15 is obtained by locally counter-stamping the strap 2 of collar 1.

The groove 14 is obtained by stamping and shown in dash lines in FIG. 15. The purpose of the counter-stamping 28 is to partially cut out the strap and restore the cutout strap portion in axial alignment with the strip 11 which is thus caused to abute the cut edge 30. By performing this step on either side of the groove 14 it is possible to obtain an accurately sized gap between the edges of the stop points which corresponds to the width of the strip 11, so that its proper axial positioning is safely warranted. The substantial reduction in the lateral clearance which can thus be obtained will minimize very considerably exhaust gas leakages in this area.

In this respect it may be pointed out that the counter-stamping 28 provides in its upper portion a bearing area common to the stamping of groove 14 and registering therewith, this area corresponding substantially to one-tenth of the thickness of the collar strap 2.

On the other hand, particular attention should be given to the tightening of collar 1. In fact, one detrimental consequence of exhaust system vibration is the loosening of bolts 8 and 9.

To avoid this inconvenience, various solutions are available. However, a simple yet efficient solution consists in bending the end of strap 2 ar right angles, as shown at 31 (FIGS. 1 and 2). Each bent edge 31 engages a flat face of the corresponding nut 8 or 9 and thus act as a lock means preventing any undesired rotation or loosening of the nut.

Another efficient bolt locking means is illustrated in FIG. 14. In this case, punched projections 32 are formed in the down-turned end 4 of strap 2 and adapted to engage flat faces of the corresponding tightening bolts. As in the case of the right-angle bent edges 31, these punched projections 32 positively prevent the rotation and therefore the loosening of the bolts.

Of course, other forms of embodiment and modifications may occur to those conversant with the art without departing however from the basic principles of the invention.

What is claimed is:

1. A device for joining two tubular members end-to-end for gaseous flow therethrough such as two exhaust gas tubular members is an exhaust gas system of a vehicle and the like comprising, a flexible split collar clamped in use circumferentially about the two tubular members to effect a joint of the two tubular members disposed end-to-end and for avoiding leakage of exhaust gases at the joint, the collar having internally thereof an internal depression extending axially and circumferentially on the collar less than the axial length of the collar and less than the circumferential extent thereof, said internal depression extending in a circumferential direction on opposite sides of a gap at the split of the collar and in use overlies the ends of the two tubular members at said joint, a flexible sealing strip disposed in said internal depression spanning the gap at the split and an area of the ends of the two tubular members at said joint when disposed end-to-end, said depression having peripheral side edges defining a space circumferentially about the flexible sealing strip, the collar being tightly clamped about the two tubular members at said joint compressing the flexible sealing strip against the two tubular members, the collar having outwardly extending flanges disposed opposed on opposite sides of the split, and means for drawing the flanges toward each other for tightly clamping the collar about said two tubular members at said joint and compressing the flexible sealing strip against the two tubular members thereby to avoid exhaust gas leakage at said joint.

2. A device for joining two tubular members end-to-end for gaseous flow therethrough such as two exhaust gas tubular members in an exhaust gas system of a vehicle and the like according to claim 1, in which said flexible sealing strip is secured at one end to said collar.

3. A device for joining two tubular members end-to-end for gaseous flow therethrough such as two exhaust gas tubular members in an exhaust gas system fo a vehicle and the like according to claim 1, in which said sealing strip has edges which are deformable.

4. A device for joining two tubular members end-to-end such as two exhaust gas tubular members in an exhaust gas system of a vehicle and the like according to claim 1, including means on said collar for improving longitudinal distribution of tightening stress.

5. A device for joining two tubular members end-to-end such as two exhaust gas tubular members in an exhaust gas system of a vehicle and the like according to claim 1, including a stop on said collar for axial positioning of said two tubular members in said collar.

6. A device for joining two tubular members end-to-end for gaseous flow therethrough such as two exhaust gas tubular members in an exhaust gas system of a vehicle and the like comprising, a flexible split collar clamped in use circumferentially about the two tubular members to effect a joint of the two tubular members disposed end-to-end and for avoiding leakage of exhaust gases as the joint, the collar having internally thereof an internal depression extending axially and circumferentially on the collar less than the axial length of the collar and less than the circumferential extent thereof, said internal depression extending in a circumferential direction on opposite sides of a gap at the split of the collar and in use overlies the ends of the two tubular members at said joint, a flexible sealing strip disposed in said internal depression spanning the gap at the split and an area of the ends of the two tubular members at said joint when disposed end-to-end, said depression having peripheral side and end edges defining a space circumferentially about the flexible sealing strip, said depression having internal lateral projections extending into said space for locating the flexible sealing strip accurately extending in the internal depression of the collar, each projection having a thickness less than the thickness of the flexible sealing strip, the collar being tightly clamped about the two tubular members at said joint compressing the flexible sealing strip against the two tubular members, the collar having outwardly extending flanges disposed opposed on opposite sides of the split, and means for drawing the flanges toward each other for tightly clamping the collar about said two tubular members at said joint thereby to avoid exhaust gas leakage at said joint.

7. A device for joining two tubular members end-to-end for gaseous flow therethrough such as two exhaust gas tubular members in an exhaust gas system of a vehicle and the like accoring to claim 6, in which said flexible strip has on a top surface thereof a flexible metallic tongue extending into said space at the ends of said depression.

8. A device for joining two tubular members end-to-end for gaseous flow therethrough such as two exhaust gas tubular members in an exhaust gas system of a vehicle and the like accoring to claim 6, in which said flexible sealing strip comprises elongated metallic strips laterally spaced on a surface thereof opposed to a surface in contact with the two tubular members, whereby small passages are defined between the ends of said space.

9. A space for joining two tubular members end-to-end for gaseous flow therethrough such as two exhaust gas tubular members in an exhaust gas system of a vehicle and the like according to claim 6, including elongated stiffening plates disposed at said flanges.

* * * * *